(12) United States Patent
Sasaki et al.

(10) Patent No.: US 6,982,720 B1
(45) Date of Patent: Jan. 3, 2006

(54) IMAGE GENERATION METHOD AND IMAGE GENERATION DEVICE

(75) Inventors: Nobuo Sasaki, Kanagawa-ken (JP); Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/438,652

(22) Filed: Nov. 12, 1999

(30) Foreign Application Priority Data

Nov. 12, 1998 (JP) ................................ 10-322584

(51) Int. Cl.
G09G 5/00 (2006.01)

(52) U.S. Cl. ..................................... 345/582

(58) Field of Classification Search ................. 345/582, 345/586, 588

See application file for complete search history.

(56) References Cited

U.S. PATENT DOCUMENTS

| | | | | |
|---|---|---|---|---|
| 4,343,037 | A * | 8/1982 | Bolton | 345/582 |
| 4,586,038 | A * | 4/1986 | Sims et al. | 345/586 |
| 4,615,013 | A * | 9/1986 | Yan et al. | 345/582 |
| 4,727,365 | A * | 2/1988 | Bunker et al. | 345/427 |
| 4,905,164 | A * | 2/1990 | Chandler et al. | 345/606 |
| 5,831,625 | A * | 11/1998 | Rich | 345/430 |
| 5,892,517 | A * | 4/1999 | Rich | 345/430 |
| 6,317,137 | B1 * | 11/2001 | Rosasco | 345/582 |
| 2002/0051003 | A1 * | 5/2002 | Cosman et al. | 345/611 |

FOREIGN PATENT DOCUMENTS

| | | |
|---|---|---|
| EP | 0438193 A2 | 7/1991 |
| EP | 0454129 A2 | 10/1991 |
| JP | 10-320569 | 12/1998 |
| WO | WO 97/06512 | 2/1997 |

OTHER PUBLICATIONS

Akeley, Reality Engine Graphics, 1993, ACM, pp. 109-116.*
Barad et al., Real-Time Procedural Texturing Techniques Using MMX, GamaNetwork, May 1, 1998, 1-20.*
Opacity-modulating Triangular Textures for Irregular Surfaces pp. 219-225, Penny Rheingans.
European Office Action dated Aug. 25, 2004.
Ken Perlin. An Image Synthesizer. Proceedings of SIGGRAPH Jul. 1985, vol. 19, No. 3, pp. 287-296.

* cited by examiner

*Primary Examiner*—Sumati Lefkowitz
*Assistant Examiner*—Motilewa Good-Johnson
(74) *Attorney, Agent, or Firm*—Katten Muchin Rosenman LLP

(57) ABSTRACT

It is an object of the present invention to generate more realistic pattern by mapping a texture to a three-dimensional polygon.

An image generation device (1) has image memory (7), in which are stored basic textures to be mapped to generate overall patterns on polygons by mapping and modulation textures with which amplitude modulation is applied to the patterns generated by mapping of the basic textures, and a pixel engine (6) which, by amplitude modulation mapping of modulation textures, performs amplitude modulation processing on the patterns generated by mapping of basic textures.

11 Claims, 14 Drawing Sheets

IMAGE GENERATION METHOD AND IMAGE GENERATION DEVICE

BACKGROUND OF THE INVENTION

1. Field of the Invention

This invention relates to an image generation method and image generation device. More specifically, the present invention relates to an image generation method and image generation device that generate two-dimensional images from three-dimensional polygons and textures.

2. Background of the Invention

The surfaces of objects around us often have repeated patterns of complex appearance, and the more complex and fine the appearance or pattern is, the more difficult it is to model it with triangles. One solution technique for this is a texture mapping.

Texture mapping produces highly realistic images with a small number of vertices by overlaying image data read by a scanner, etc. onto the surface of objects.

On the other hand, in a graphic system, an entire three-dimensional image is drawn by breaking up the three-dimensional image into triangles or other polygons (unit figures) and drawing these polygons.

In a graphic system that generates two-dimensional images from such three-dimensional polygons and textures, drawing from near the viewpoint to the far distance is rendered by the texture mapping for ground surfaces, water surfaces, and floors.

When one attempts to render an image by texture mapping, the texture that is mapped onto a shape near the viewpoint becomes greatly stretched, which tends to blur the image and greatly detract from the sense of presence.

One way to avoid this is to use a high-density texture. But this method has the disadvantage of wasting a large quantity of texture memory. Also, one encounters a great decrease in processing speed due to page breaks in texture memory that is constituted with the usual kind of dynamic RAM, because access to an extensive address space is required when doing texture mapping.

Another way to avoid this is to express textures with a combination of recursive affine transforms using fractal compression technology, controlling the depth of the recursive drawing in accordance with the precision required at the time of execution. However, this method has the disadvantage that it needs a large quantity of computation resources for recursive drawing, with not much compression possible for images of low recursiveness.

And with regard to reduction or enlargement of an original image at various rates of reduction, the MIPMAP technique, in which image patterns are rendered with reduced or enlarged textures, is superior in that there is little distortion of the image, and texture mapping can be done at high speed. But a problem with this MIPMAP technique is that shapes near the viewpoint are blurred.

SUMMARY OF THE INVENTION

An object of this invention, which was devised with the above-described situation in mind, is to provide an image generation method and image generation device that can generate more-realistic patterns in two-dimensional images by means of texture mapping to three-dimensional polygons.

In order to solve the above problems, the image generation method of this invention generates overall patterns on polygons by the mapping of basic textures, and does amplitude modulation processing on patterns generated by the mapping of basic textures, by amplitude modulation mapping of modulation textures.

That is, the image generation method of the present invention by means of amplitude modulation mapping of modulation textures, does amplitude modulation processing on patterns generated by the mapping of basic textures.

This image generation method appropriately generates the details of patterns in the region near the viewpoint, i.e., the foreground.

Also, in order to solve the above problems, the image generation device of this invention has a memory means that stores basic textures which is mapped to generate the overall pattern on a polygon, and modulation textures used to amplitude-modulate the patterns generated by mapping of the basic textures, and an image processing means that, by amplitude modulation mapping of modulation textures, does amplitude modulation processing on the patterns generated by mapping of the basic textures.

By amplitude modulation mapping of modulation textures, an image generation device having such a composition does, through its image processing means, amplitude modulation processing on patterns generated by mapping of basic textures.

In this way, the image generation device appropriately generates the details of the pattern in the region near the viewpoint.

DETAILED DESCRIPTION OF THE PREFERRED EMBODIMENTS

Figure 1:
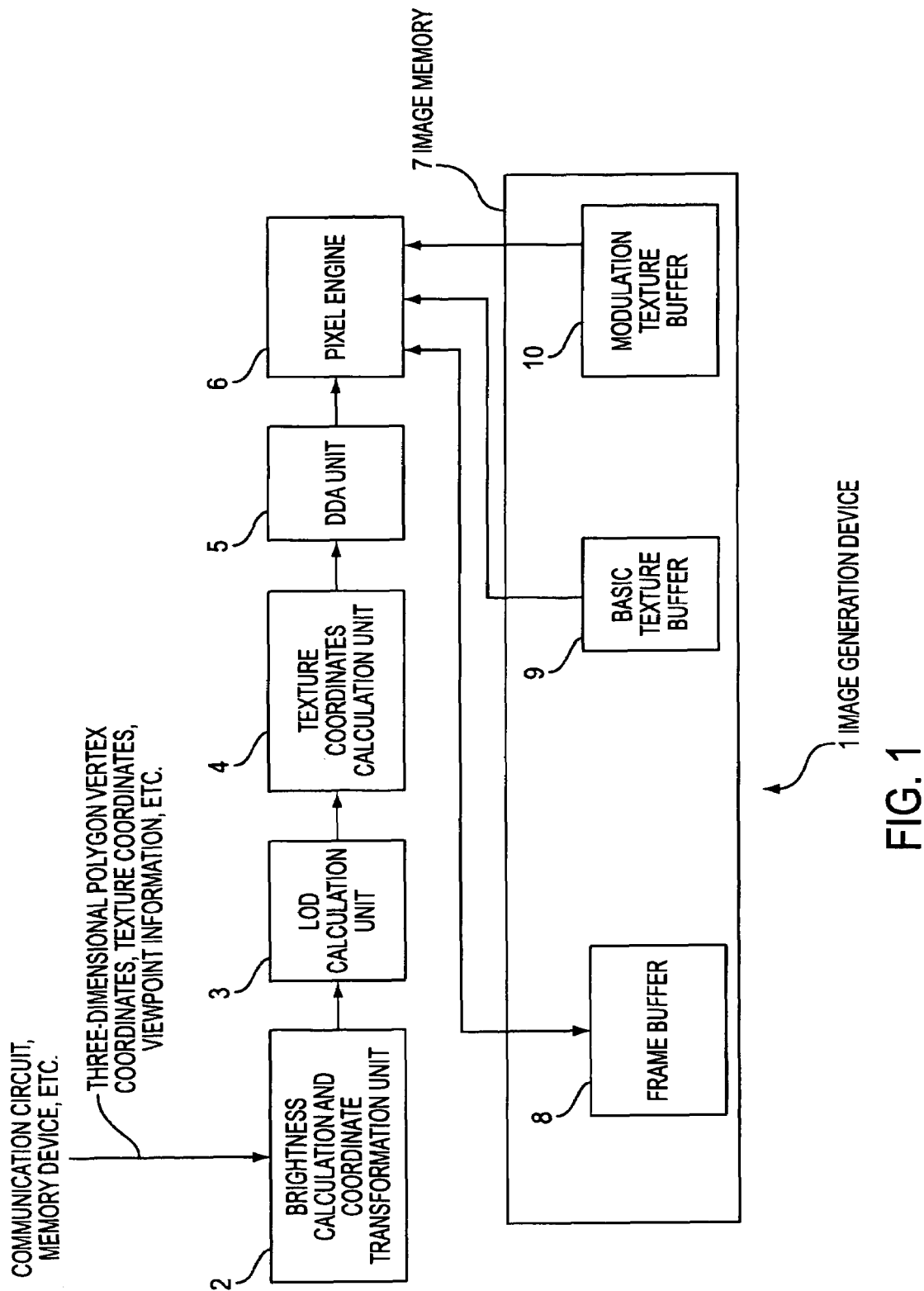
FIG. 1 is a block diagram showing the composition of an image generation device according to an embodiment of the present invention.

In the following, an embodiment of the present invention will be described in detail, using the drawings. This embodiment is one in which the image generation method and image generation device of this invention are applied to an image generation device that generates two-dimensional images by texture mapping to three-dimensional polygons. For example, the image generation device that is an embodiment is made so that it can be applied to a three-dimensional television game device, a three-dimensional moving image display device, and a three-dimensional moving image transfer device. As shown in FIG. 1, an image generation device 1 has a brightness calculation and coordinate transformation unit 2, LOD (level of detail) a calculation unit 3, a texture coordinate calculation unit 4, a DDA (digital differential analyzer) unit 5, a pixel engine 6, and an image memory 7.

In the image generation device 1, image memory 7 is made of a memory means in which are stored basic textures mapped to generate overall patterns on polygons, and modulation textures with which amplitude modulation is applied to the patterns generated by mapping of the basic textures, and pixel engine 6 is made of an image processing means that, by amplitude modulation mapping of modulation textures, performs amplitude modulation processing on the patterns generated by mapping of basic textures.

Figure 2:
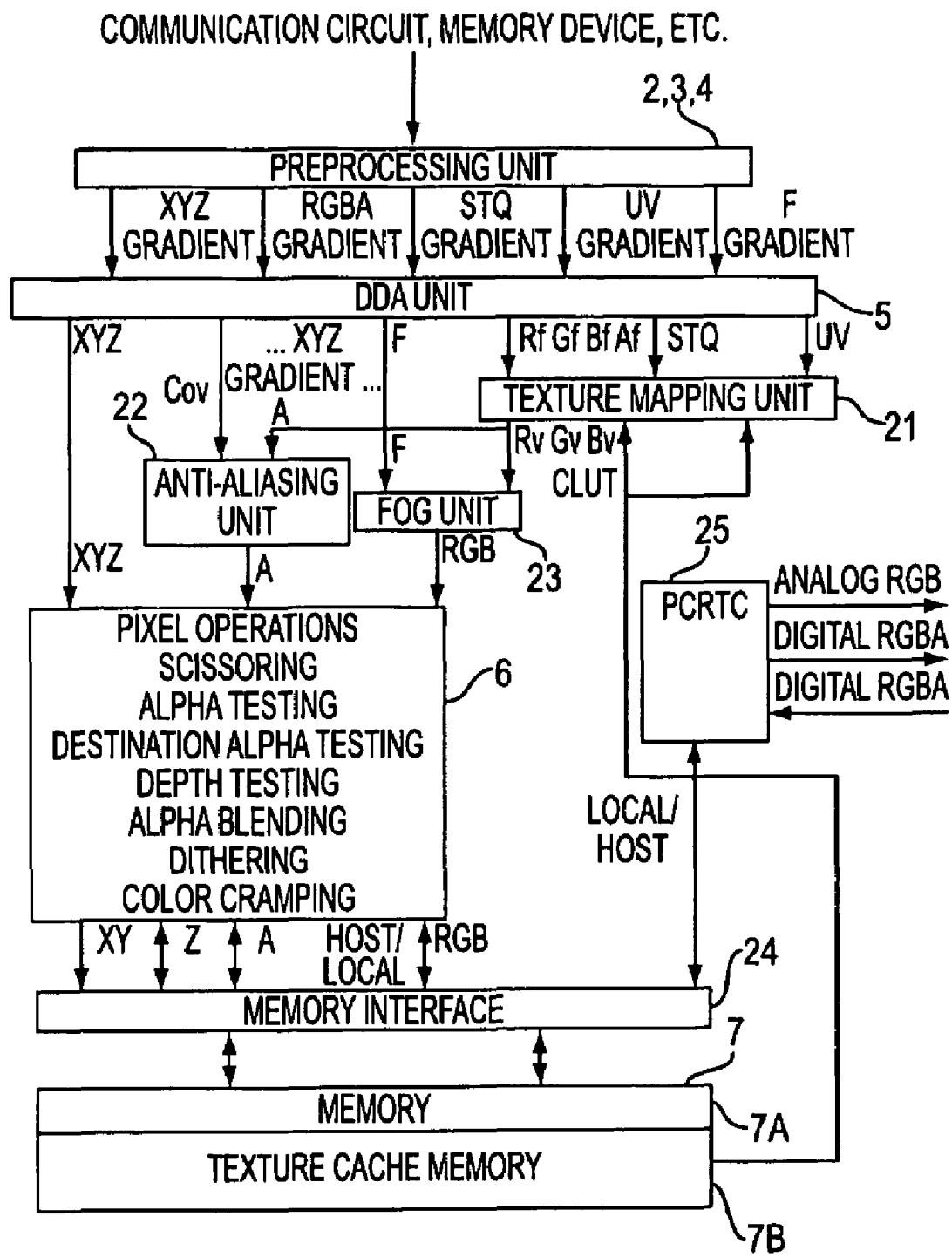
FIG. 2 is a block diagram showing the configuration of the image generation device together with the flow of data.

FIG. 2 shows the configuration, including the data flow, inside image generation device 1 shown in FIG. 1.

That is, image generation device 1 shown in FIG. 2 is arranged so as to inlcude a texture mapping unit 21, an anti-aliasing unit 22, a fog processing unit 23, a memory interface 24, and a PCRTC (programmable CRT controller) 25. Also shown in FIG. 2 is a preprocessing unit 2, 3, 4, which includes the brightness calculation and coordinate transformation unit 2, LOD calculation unit 3, and texture coordinate calculation unit 4 of image generation device 1 shown in FIG. 1.

The constituent parts of this image generation device 1 are described in detail in the following.

Various information for generating three-dimensional images is input to image generation device 1, which generates images by this various information. For example, the various information that is input includes three-dimensional polygon vertex information, blend information, texture coordinate information, light source information, and viewpoint information. Image generation device 1 obtains all these informations from, for example, communication lines or memory devices, etc.

For example, a description is given as follows for polygons input to image generation device 1, which in general consist of polygons but in this embodiment are taken to be independent triangles, in order to simplify the description.

As functions of the system of image generation device 1 itself, it can be applied to various primitives including points and straight lines.

Polygon information is information that consists of the coordinates p1(px1,py1,pz1), p2(px2,py2,pz2), p3(px3,py3,pz3) of the vertices of polygons that are independent triangles. And information on the normals of these vertices is input as n1(nx1,ny1,ny1), n2(nx2,ny2,nz2), n3(nx3,ny3,nz3).

Texture coordinate information is information that consists of the texture coordinates a1(s1,t1,q1), a2(s2,t2,q2), a3(s3,t3,q3) of the vertices of polygons that are independent triangles.

Blend information is a blending coefficient (blend coefficient $\alpha$) showing the allocation of blends of the image when textures are mapped. Specifically, blend coefficient $\alpha$ is set to $\alpha 1, \alpha 2, \alpha 3$ corresponding to RGB. This blend information, together with the RGB values, constitute the RGBA values.

Viewpoint information (eyex,eyey,eyez) and light source information (lx,ly,lz) are information used for performing brightness calculations and coordinate transformations with respect the polygons. Also, there may be multiple items of light source information.

Various additional information such as color information or fog values may also be associated with each polygon vertex.

Here, the fog value is a value used for performing image processing so that objects in the distance assume the fog color; it is a value used for generating images with a so-called fog effect.

Multiple independent-triangle polygons to which various such information is added are input into image generation device 1.

Texture information, in which pixels having RGBA values are aligned in an array, are accessed by the texture coordinates of the polygon vertices.

Such polygon information is first input to brightness calculation and coordinate transformation unit 2 in image generation device 1.

Brightness calculation and coordinate transformation unit 2 takes the polygon information that has been input and combines it with viewpoint information to make a coordinate transformation to a coordinate system for drawing. And brightness calculation and coordinate transformation unit 2 calculates the brightness of each vertex of each polygon from the viewpoint information and the light source information.

Along with performing the above-described calculations, brightness calculation and coordinate transformation unit 2 makes a trial execution of a perspective transformation, etc.

For example, by a coordinate transformation of an independent-triangle polygon, the coordinates of the vertices become q1(qx1,qy1,iz1), q2(qx2,qy2,iz2), q3(qx3,qy3,iz3). Here, coordinates qx,qy are the coordinates on the drawing screen, and coordinates iz are coordinates in the depth direction of the plane transformed into integers for the z buffer. The brightness of each vertex is determined from the normal vector of the vertex, the viewpoint information, and the light source information.

The values thus calculated by brightness calculation and coordinate transformation unit 2 are input from preprocessing unit 2, 3, 4 to DDA unit 5 as the gradient of the XYZ value, the gradient of the RGBA value, and the gradient of the F value consisting of the fog value, as shown in FIG. 2. Here, the XYZ value consists of the values of the X,Y,Z coordinates of each of the three vertices of the three-dimensional polygon; that is, it is set to information concerning points, lines, and the shape of the polygon, etc.

LOD calculation unit 3 calculates the LOD value from the transformed z coordinates. Based on this LOD value, pixel engine 6 selects a basic texture stored in basic texture buffer 9. Here, the basic textures are textures that are mapped to three-dimensional polygons with the use of the MIPMAP method.

The MIPMAP method is a mapping method in which textures of different sizes ½, ¼, ⅛, . . . (ratios of the lengths of the sides) are prepared as textures to be attached to three-dimensional polygons, these prepared textures are selected according to the rate of reduction, and mapping is done to three-dimensional polygons; for example, generation is done for various textures using a low-pass filter.

In the MIPMAP method, adopting a mapping method like this prevents the occurrence of aliasing when texture mapping is done, because mapping to the polygons on the screen is done with the original texture reduced in size.

For example, the texture of each level (MIP level) can be obtained by applying a low-pass filter to images that each have one small MIP value, and reducing it to ½.

In the following explanation for each type of texture, the same texture as the original image is called texture MIP0, the texture of ½ the original image is called texture MIP1, and texture of ¼ the original image is called texture MIP2, and so on.

The numerical value that follows MIP represents the MIP level, and this corresponds to the LOD value. The LOD value is a value that is calculated from the rate of reduction of each polygon, and a rate of reduction is represented by, for example, the logarithm of the distance from the viewpoint to the polygon.

The basic texture corresponding to the LOD value computed by LOD calculation unit 3 is read from basic texture buffer 9 of image memory 7.

Texture coordinate calculation unit 4 calculates from the texture coordinate value for the basic texture the texture coordinate value used for reading the modulation texture.

As shown in FIG. 2, the value computed by calculation in the texture coordinate calculation unit 4 is input to DDA unit 5 as the gradient of the UV value and the gradient of the STQ value from preprocessing unit 2, 3, 4. Here, the UV value is the coordinate value of the texture, and the STQ value is the value of the texture coordinate at each of the three vertices of the polygon; that is, they consist of values of the same-order texture coordinates (for perspective correction).

DDA unit 5 converts the two-dimensional polygon vertex information, z information, and brightness information, etc. obtained from texture coordinate calculation unit 4 into pixel information. Specifically, DDA unit 5 successively determines the pixel coordinates (apx,apy), z value (aiz), brightness, and texture coordinates (as,at,aq) by linear interpolation.

As shown in FIG. 2, the DDA unit 5 outputs, as transformation-processed values, the XYZ value, F value, Rf value, Gf value, Bf value, Af value, STQ value, and UV value. Here, the XYZ value is input into pixel engine 6, the F value is input into fog unit 23, and the Rf value, Gf value, Bf value, Af value, STQ value, and UV value are input into texture mapping unit 21.

Anti-aliasing unit 22, in processing the picture so that it is smooth by blurring the jagged edges of lines and images, performs processing by a blending using the a value from texture mapping unit 21.

Fog processing unit 23 is the part that does processing by a fog effect using the fog value. Specifically, using the F value from DDA unit 5, it carries out processing on the pixel values output from texture mapping unit 21.

Texture mapping unit 21 is the part that carries out control of the texture mapping based on various information.

PCRTC 25 is the part that outputs the image signal that has undergone the desired processing to the monitor as analog RGB and digital RGB.

Pixel engine 6 performs, as pixel operations on pixels, processing known as scissoring, a testing, destination a testing, depth testing, a blending, dithering, and color cramping.

Here, scissoring or clipping is a processing by which data that protrudes outside the screen is removed;
  α testing is a processing in which whether drawing shall be done is controlled by the a value of a pixel;
  destination α testing is a processing in which whether drawing shall be done is controlled by the blend coefficient α of a pixel of the frame buffer that is to be written into;
  depth testing is a testing by the Z buffer;
  α blending is a processing in which the pixel value of the frame buffer and the pixel value to be written in are linearly interpolated by the blend coefficient α;
  dithering is a processing in which colors are interspersed in order to render many colors with a small number of colors; and
  color cramping is a processing in which, when calculating colors, the value is restricted so as not to exceed 255 or be less than 0.

Specifically, pixel engine 6 performs the following processing: Pixel engine 6 computes pixel information between the pixel information read out from basic texture buffer 9 and writes it into frame buffer 8. And when writing into frame buffer 8, as necessary, pixel engine 6 controls the writing-in by referencing the z buffer. In addition, pixel engine 6 has a bilinear interpolation function, by which pixel values are determined by linear interpolation of four pixels in a lattice read from basic texture buffer 9, as well as a function by which the pixel values of frame buffer 8 are read out, and multiplication (modulation calculation) is done between this value and the pixels of the modulation texture to be written in.

That is, for example, pixel engine 6 has the function of texture mapping, z comparison, pixel calculation, and reading and writing pixels from and to frame buffer 8, as well as performing modulation, etc.

Memory interface 24 shown in FIG. 2 is an interface for transmitting data between pixel engine 6 and image memory 7. Specifically, this memory interface 24 makes it possible to send and receive XYZ values, A values (blend coefficients α), and RGB values between pixel engine 6 and image memory 7.

Image memory 7 has the memory regions, i.e., frame buffer 8, in which frames are stored, basic texture buffer 9, in which basic textures are stored, and modulation texture buffer 10, in which modulation textures are stored. For example, as shown in FIG. 2, image memory 7 consists of a main memory 7a and a texture cache memory 7b. Here, texture cache memory 7b is constituted as a cache memory used for accessing texture information at high speed.

As stated above, basic textures are textures that are generally used by MIPMAP. These basic textures are used to generate the overall pattern of a texture-mapped shape. For example, basic textures are stored in compressed form in basic texture buffer 9.

Modulation textures are textures that are used for adding even higher-frequency components to basic textures. For example, a modulation texture is set to a texture that consists of higher-frequency components by offsetting its repetition period from the repetition period of a basic pattern.

Figure 3:
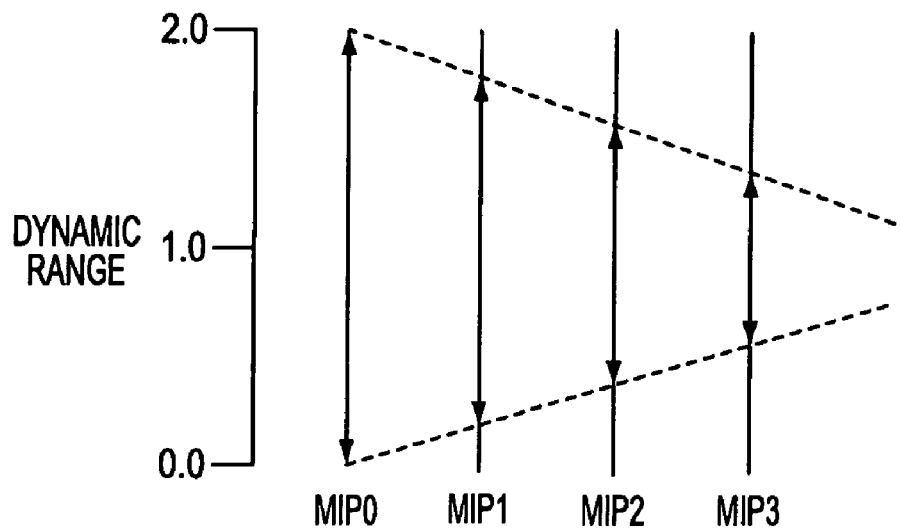
FIG. 3 is a diagram showing the relationship between modulation textures and the dynamic range.

As shown in FIG. 3, the modulation textures are such that the dynamic range of the modulation decreases as the MIP level increases. This is because it is desirable to work in the part where the enlargement rate of a basic texture is greater than 1.

The pixel value of a modulation texture represents the intensity for further carrying out multiplication on and applying modulation to the pixel values of an image drawn using a basic texture. For example, if a texture is expressed with 8 bits, one associates texture value 0 with multiplication coefficient 0.0, texture value 128 with multiplication coefficient 1.0, and texture value 256 with multiplication coefficient 2.0. That is, for the images of each MIP level, one performs not just low-pass filter reduction but also dynamic range reduction processing.

As stated above, the repetition period of a modulation texture is offset from the repetition period of the basic texture; specifically, if the image size of the modulation texture is the same as that of the basic texture, the repetition period is offset by using for reading the modulation texture the texture coordinates (s2i,t2i) that are the result of offsetting the texture coordinates (si,ti) of the basic texture several-fold.

This relationship can be shown by formulas (1) and (2).

$$s2i = \gamma \times si + \beta \quad (1)$$

$$t2i = \gamma \times ti + \beta \quad (2)$$

Here, (si,ti) are the original texture coordinates of the basic texture, and (s2i,t2i) are the texture coordinates used for the reading out of the modulation texture. Also, $\gamma$ is an integer where $\gamma > 1$, and $\beta$ is a constant.

If the modulation texture is not a repetition texture, it will be necessary to change the way of advancement of values if the texture coordinate value exceeds 0 and 1.

Figure 4:
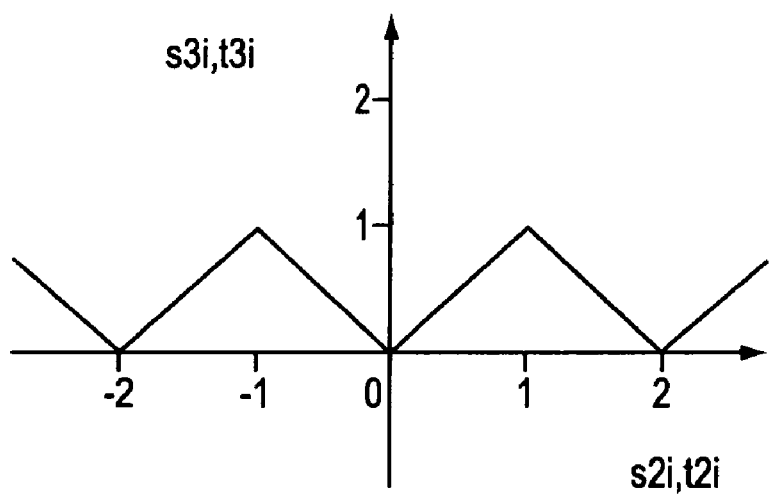
FIG. 4 is a diagram showing the case in which the modulation texture is not a repeated texture.

Because of this, if one denotes by (s3i,t3i) is the texture coordinates that are ultimately used, then a transformation is made from texture coordinates (s2i,t2i) to texture coordinates (s3i,t3i) according to a graph as shown in FIG. 4.

And because the modulation texture is reduced to $1/\gamma$ with respect to the basic texture, it is necessary to give the polygon LOD value shifted by $\log_2(\gamma)$.

Figure 5:
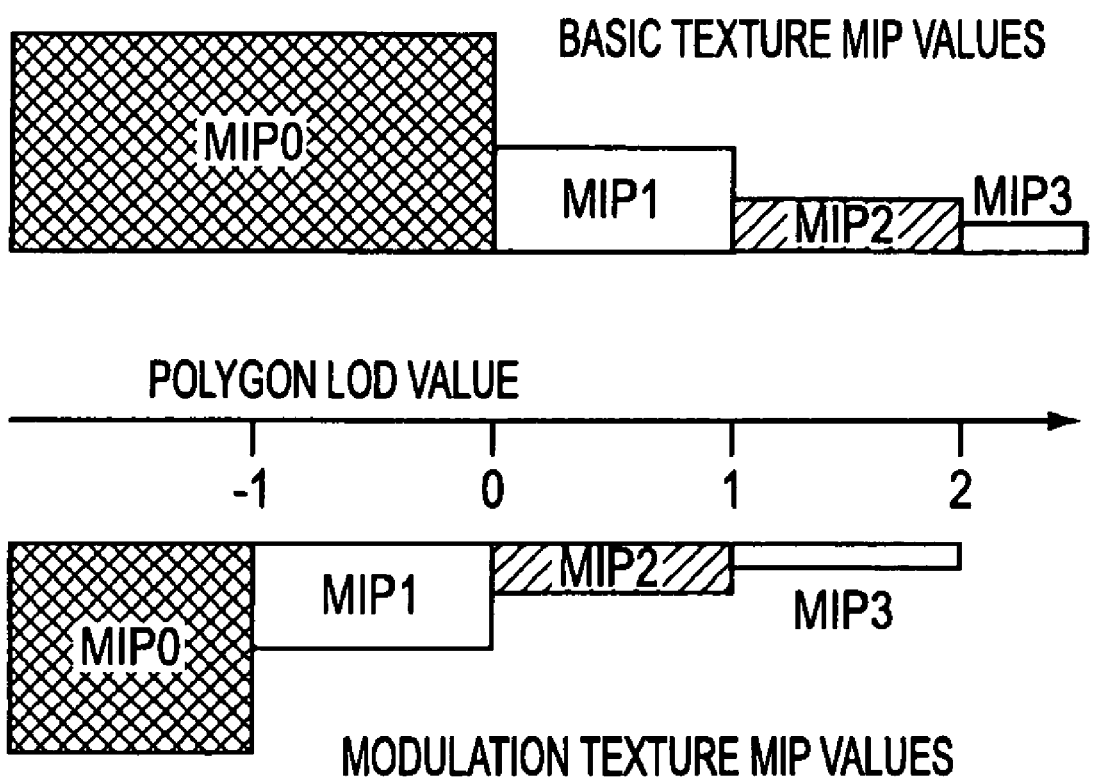
FIG. 5 is a diagram showing the relationship of the MIP values between a basic texture and a modulation texture.

For example, if $\gamma=2$, then the MIP levels of the basic textures and modulation textures used with respect to the LOD value of the polygon will be as shown in FIG. 5.

The aforementioned basic textures and modulation textures are stored in basic texture buffer 9 and modulation texture buffer 10, respectively.

Figure 6:
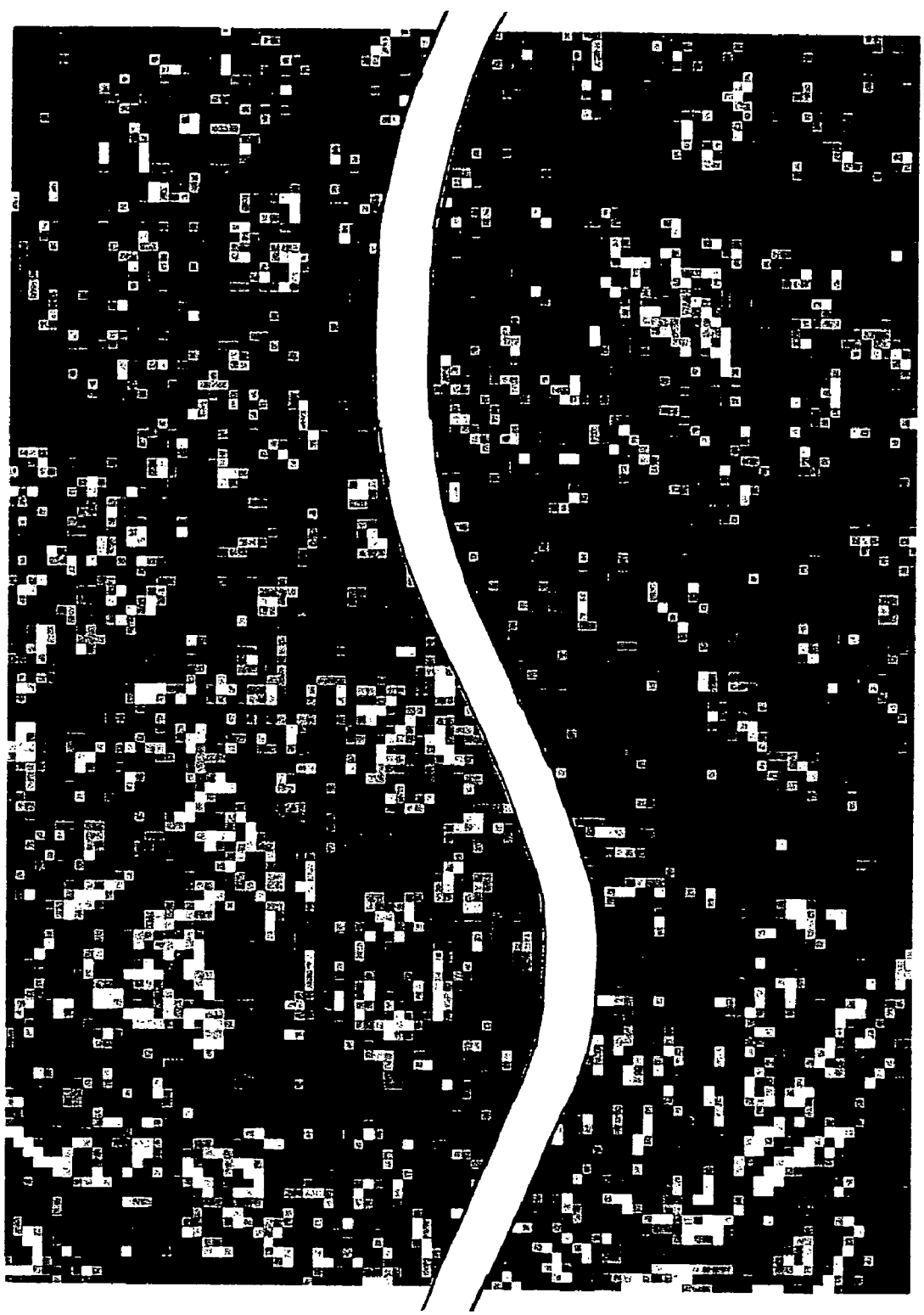
FIG. 6 is a diagram showing the basic texture of MIP0.
Figure 7:
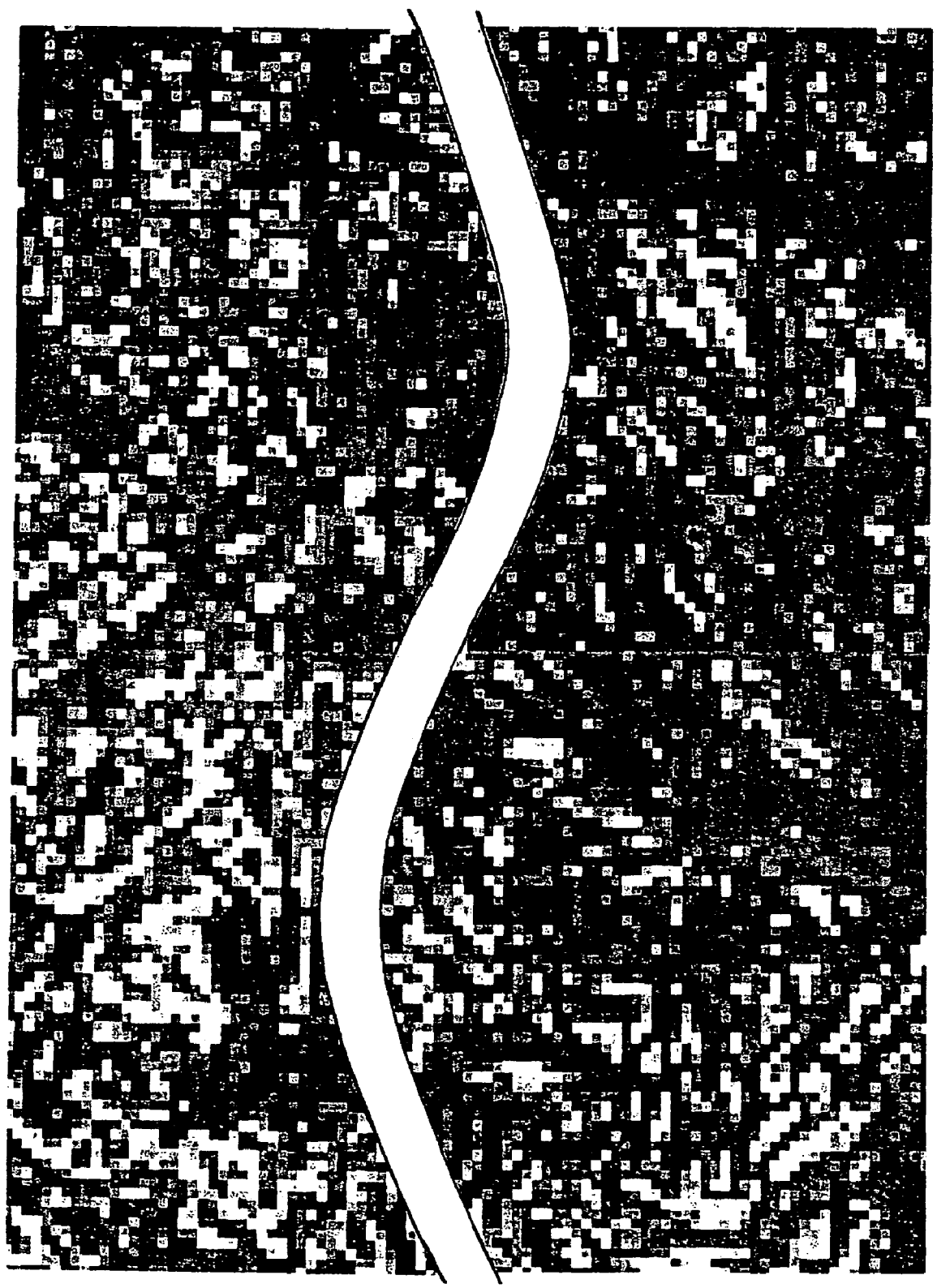
FIG. 7 is a diagram showing the modulation texture of MIP0.
Figure 8:
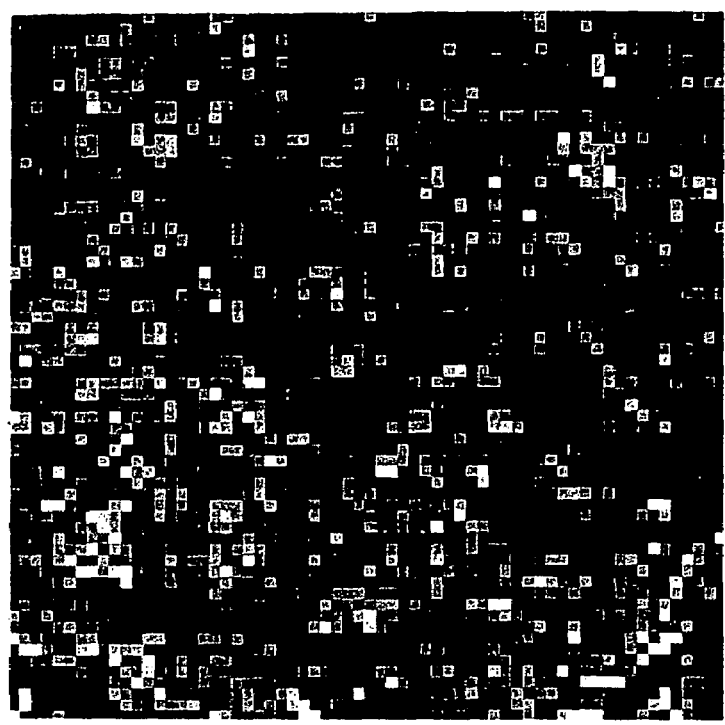
FIG. 8 is a diagram showing the basic texture of MIP1.
Figure 9:
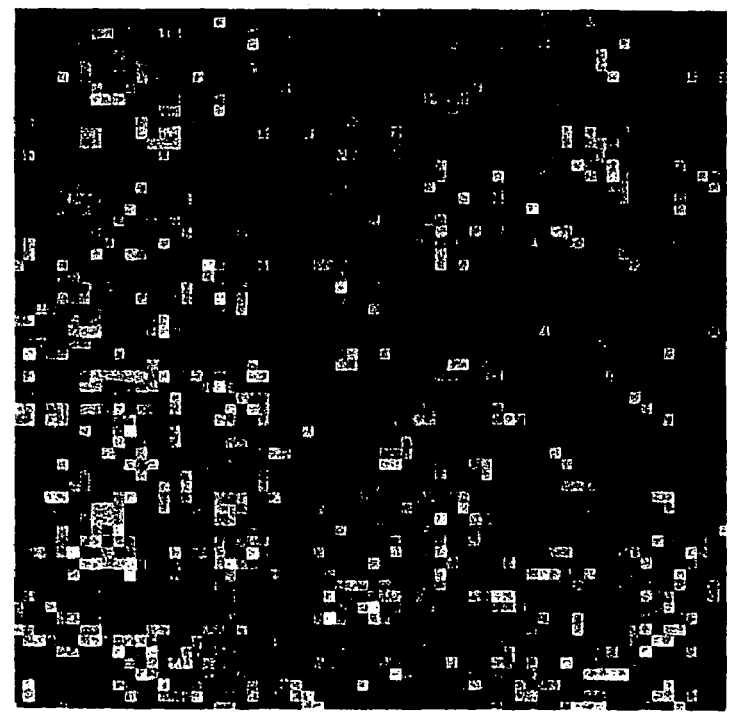
FIG. 9 is a diagram showing the modulation texture of MIP1.
Figure 10:
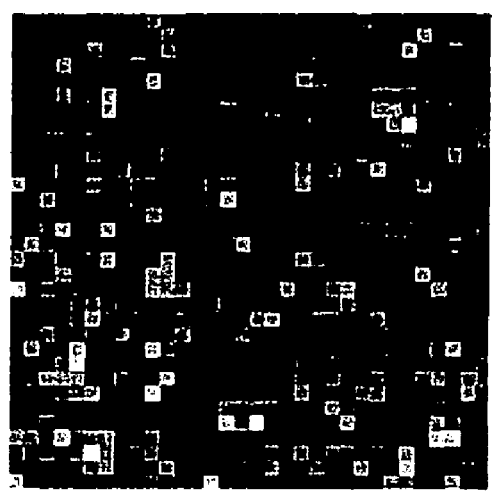
FIG. 10 is a diagram showing the basic texture of MIP2.
Figure 11:
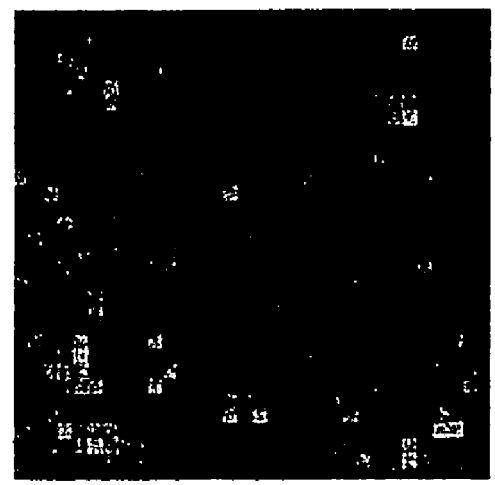
FIG. 11 is a diagram showing the modulation texture of MIP2.
Figure 12:
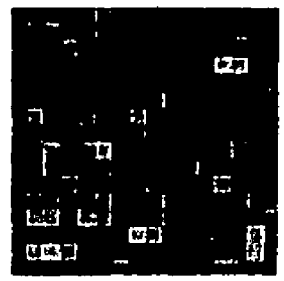
FIG. 12 is a diagram showing the basic texture of MIP3.
Figure 13:
FIG. 13 is a diagram showing the modulation texture of MIP3.

Also, the basic textures and modulation textures may be stored within the same buffer. For example, the basic buffer may be provided in the RGB part of the RGBA buffer, and the modulation textures may be provided in its A part. Specific examples of basic textures and modulation textures are shown in FIGS. 6 through 13. FIGS. 6, 8, 10, and 12 show the basic textures of MIP0, MIP1, MIP2, and MIP3, respectively, while FIGS. 7, 9, 11, and 13 show the modulation textures of MIP0, MIP1, MIP2, and MIP3, respectively. Part of the texture of MIP0 in FIGS. 6 and 7 is omitted from the diagram.

Because, as stated above, the dynamic range of the modulation is reduced as the MIP level increases, as the MIP level increases, one gets a "blurred" feeling, as shown in FIGS. 7, 9, 11, and 13. Actually, if the image size of the modulation texture is the same as that of the basic texture, then, as stated above, mapping of a higher frequency will be done, so the modulation texture will be read out based on texture coordinate values in which the texture coordinate values of the basic texture are shifted several-fold.

The parts of image generation device 1 are constituted as described above. And stored in image memory 7 are, besides basic textures, modulation textures.

Figure 14:
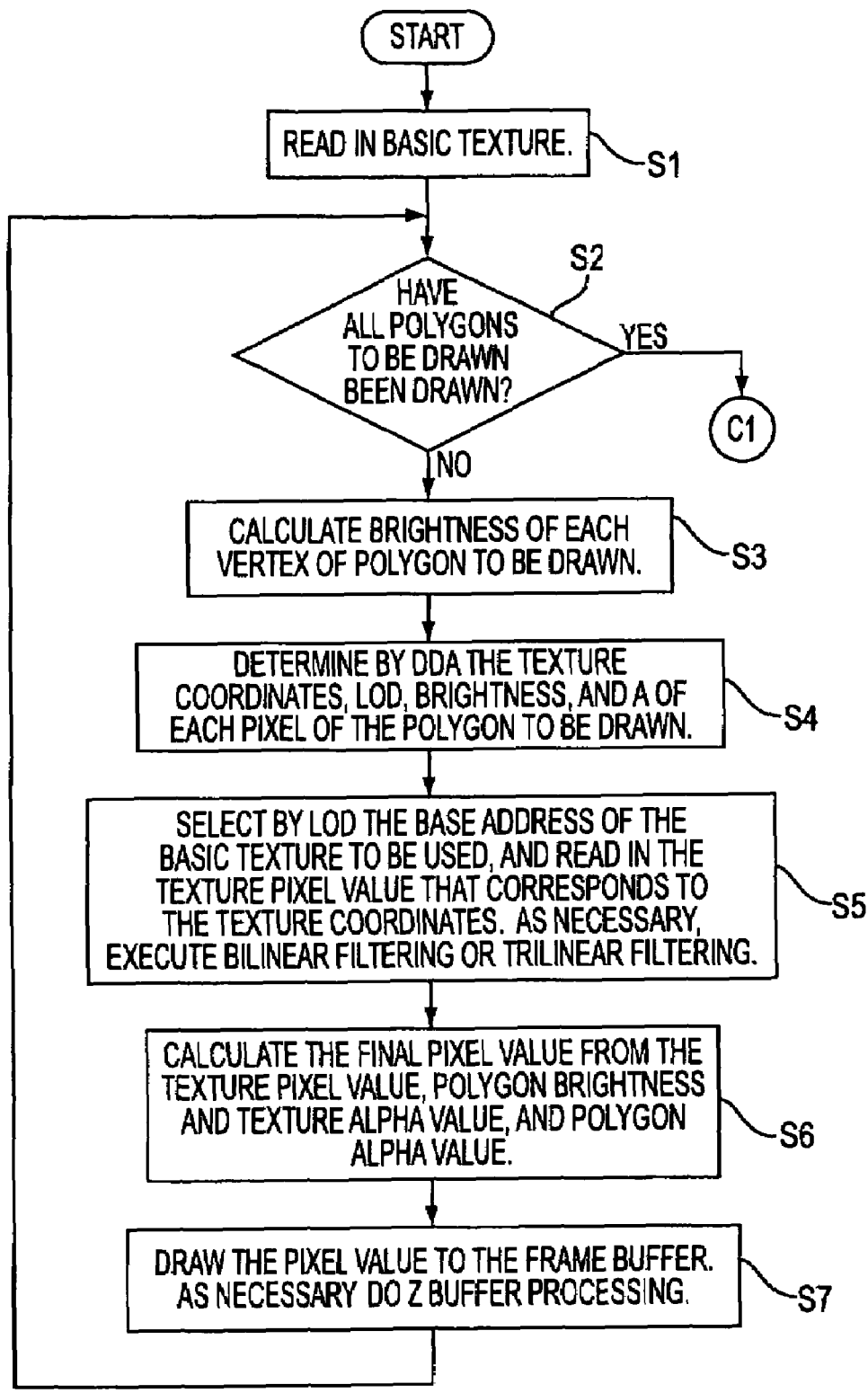
FIG. 14 is a flowchart showing the series of processing steps by which an image is generated using basic textures, showing the processing by which amplitude modulation by modulation textures is applied to the pattern of the image generated by using basic textures.
Figure 15:
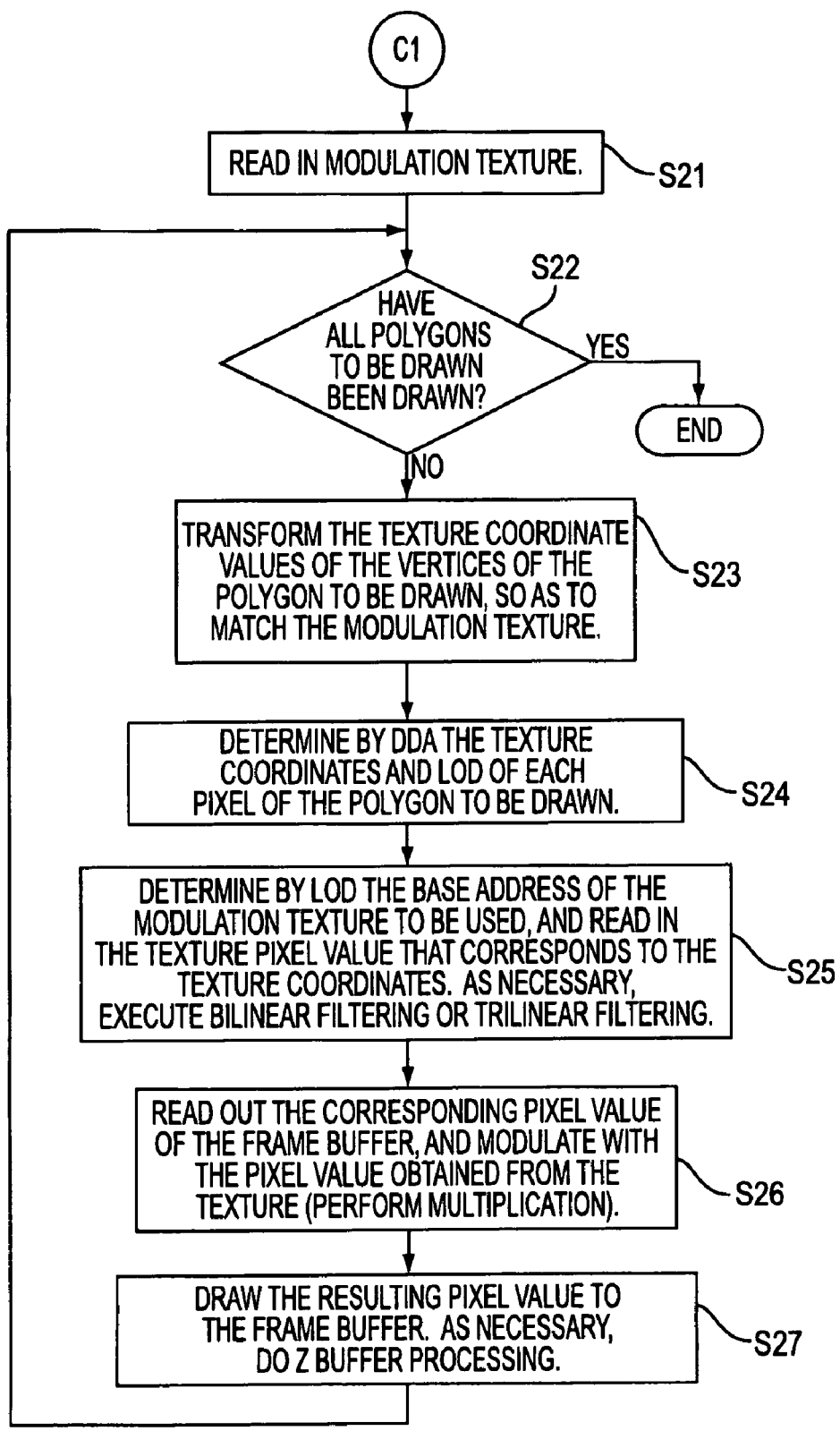
FIG. 15 is a flowchart showing the series of processing steps by which amplitude modulation by modulation textures is applied to an image, showing the processing by which amplitude modulation by modulation textures is applied to the pattern of the image generated by using basic textures.

Next, we describe the processing procedure by which modulation textures are used to perform amplitude modulation on the patterns of images generated by basic textures. FIG. 14 shows the series of processing steps by which an image is generated using basic textures, and FIG. 15 shows the series of processing steps by which amplitude modulation is applied to an image with modulation textures.

As shown in FIG. 14, in step S1, image generation device 1 reads a basic texture by pixel engine 6.

In step S2, pixel engine 6 confirms whether drawing of all polygons to be drawn has been completed. If pixel engine 6 confirms that drawing of all polygons to be drawn has been completed, one proceeds to step S21 of FIG. 15, and if it confirms that drawing of all polygons to be drawn has not been completed, one proceeds to step S3.

In step S3, pixel engine 6 calculates the brightness of each vertex of the polygon to be drawn. Then, in step S4, image generation device 1, by means of DDA unit 5, determines the texture coordinates, LOD value, brightness, and A (a value) of each image of the polygon to be drawn.

In step S5, pixel engine 6 selects the base address of the base texture to be used according to the LOD value, and reads the pixel values of the basic texture coresponding to the texture coordinates. Also, here, a bilinear filter or trilinear filter is applied as necessary. If necessity is caused, a bilinear filtering or a trilinear filtering is carried out.

Here, so-called trilinear processing, in which a trilinear filter is applied, is processing in which, if the LOD value takes on an intermediate value, linear interpolation of the pixel values of different MIP levels is carried out. Even if such trilinear processing is done, the effectiveness of the technique is the same.

Then, in step S6, pixel engine 6 calculates the final pixel values from the pixel values of the basic texture, brightness of the polygons, the alpha value of the basic texture, and the alpha value of the polygons.

In step S7, pixel engine 6 draws the pixel values to frame buffer 8. Here, Z buffer processing is done as necessary. Following processing of this step S7, pixel engine 6 decides again in step S2 whether drawing of all polygons to be drawn has been completed.

In step S21, shown in FIG. 15 to which one proceeds if in step 2 it is confirmed that drawing of all polygons to be drawn has been completed, image generation device 1, by means of pixel engine 6, reads in a modulation texture from modulation texture buffer 10. If it is confirmed that drawing of all polygons to be drawn has been completed, pixel engine 6 terminates said processing, and if it has been confirmed that drawing of all polygons to be drawn has not been completed, one proceeds to step S23.

In step S23, the texture coordinate values of the vertices of the polygon to be drawn are transformed to fit the modulation texture.

Then, in step S24, image generation device 1, by means of DDA unit 5, determines the texture coordinates and LOD value of each pixel of the polygon to be drawn.

In step S25, pixel engine 6 decides by the LOD value the base address of the modulation texture to be used and reads in the pixel values of the texture that corresponds to the texture coordinates. Also, a bilinear filter or trilinear filter is applied as necessary.

In step S26, pixel engine 6 reads out the corresponding pixel value of frame buffer 8 and modulates this pixel value (multiplies it) by using the modulation texture.

In step S27, pixel engine 6 draws the resulting pixel values to frame buffer 8. Here, Z buffer processing is done as necessary. After processing of step S27, once again, in step S22, it is decided whether drawing of all the polygons to be drawn has been completed.

By the above series of processing steps, image generation device 1, by using a modulation texture, applies amplitude modulation to the patterns of the image generated by using the basic textures.

Image generation device 1 has the above composition, and by generating images, it is able to generate images that have the appropriate detail in a region near the viewpoint, where a lowering of the image resolution is seen in ordinary texture mapping processing.

Figure 16B:
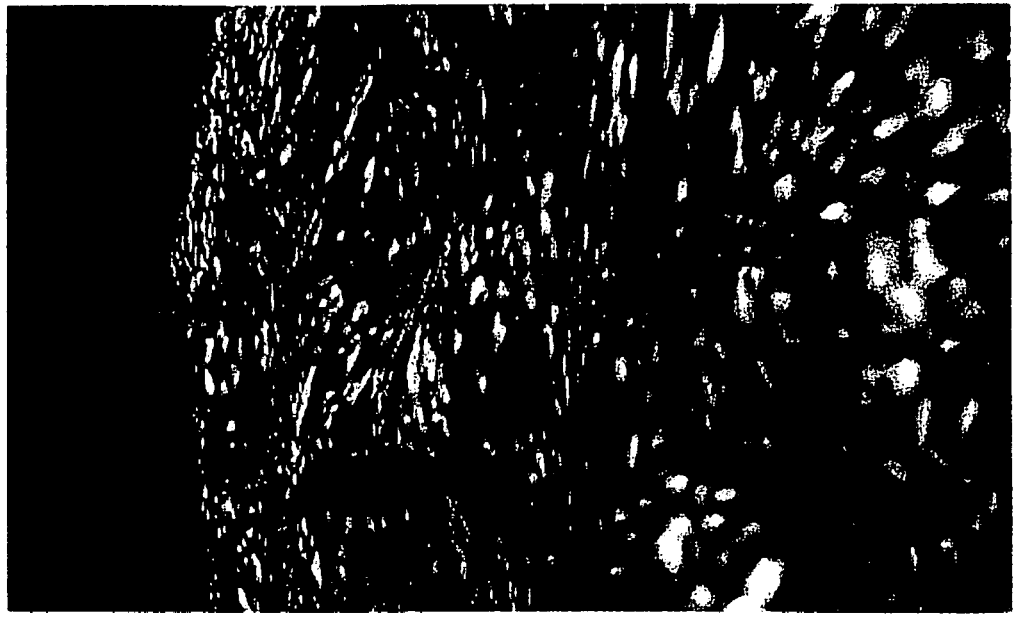
FIGS. 16A and 16B are diagrams showing an image generated by texture mapping to which the present invention is applied, and an image generated by conventional texture mapping.
Figure 16A:
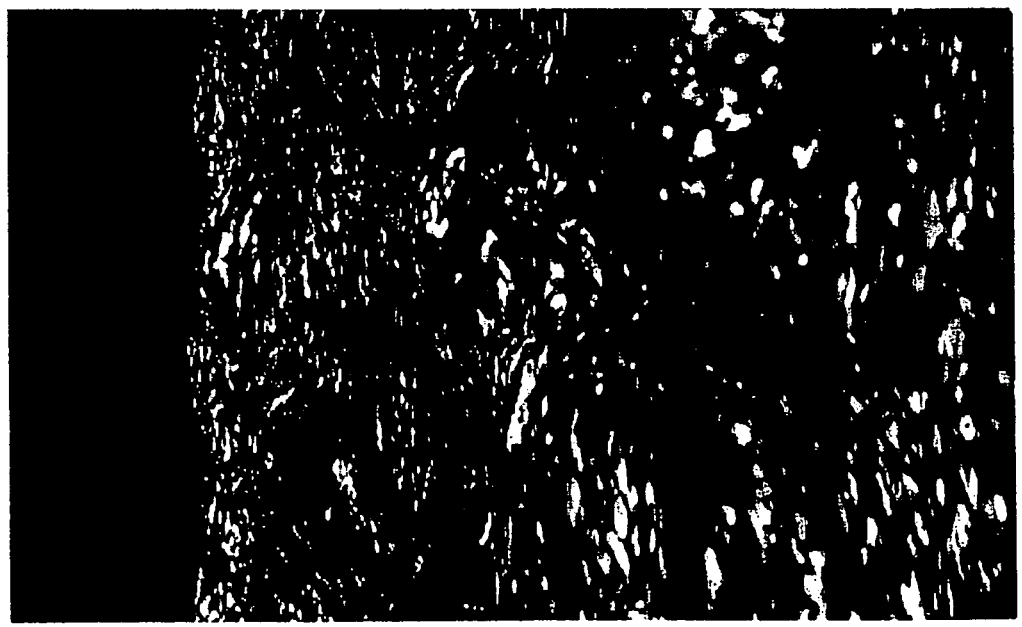
Figure 17B:
FIGS. 17A and 17B are a diagrams showing another image generated by texture mapping to which this invention is applied, and an image generated by conventional texture mapping.
Figure 17A:
Figure 18B:
FIGS. 18A and 18B are diagrams showing the procedure of texture mapping
Figure 18A:
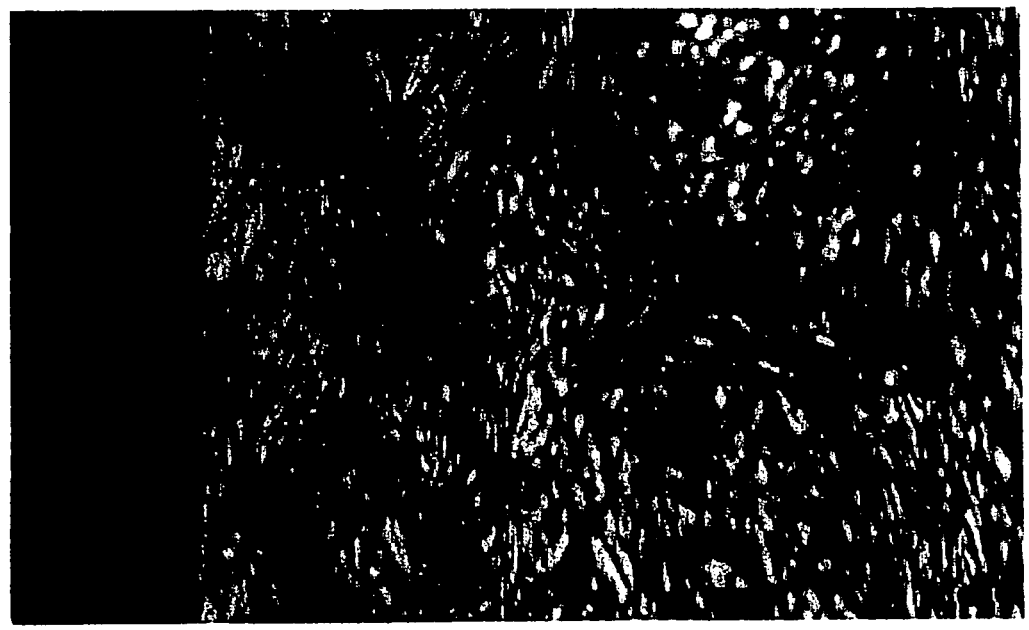

FIGS. 16A–16B and 17A–17B show specific examples of images generated by texture mapping. Here, texture mapping is done by mapping textures to a base consisting of a group of polygons, as shown in FIG. 18B to that shown in FIG. 18A.

Specifically, in FIG. 16A is an image generated by applying this invention, while in FIG. 16B is an image generated by ordinary texture mapping; clearly, the image shown in FIG. 16A, which is an image generated by applying this invention, is drawn as an image having the appropriate detail.

Accordingly, with regard to regions other than near the viewpoint, what one obtains is an image that is almost as with the basic texture, making it easy to create an image as the designer intended it. And by combining this with destination alpha testing, it is possible to create resolution only for specified regions.

Also, because image generation device 1 can use the existing MIPMAP processing mechanism, it is easy to speed up the image generation.

By increasing the dynamic range of modulation textures as the MIP value gets smaller, the resolution of nearby parts can be effectively emphasized.

And in a region where the MIP value >0, where the basic texture tends to be reduced, a natural decrease in resolution is realized by processing that reduces the dynamic range of the modulation, thus preventing the occurrence of aliasing.

Moreover, in image generation device 1, the modulation textures can be constituted so that they are different from the basic textures. By making the modulation textures into textures that are unrelated to the basic textures, for example by making them into textures that convey the feeling of a material such as the surface of cloth, it becomes possible to naturally render the details of an image. Specifically, in FIG. 17A is an image that is generated by modulation textures made up of a patchwork, and in FIG. 17B is an image made with ordinary original textures; clearly, the image shown in FIG. 17A is drawn as an image having more detail.

Also, image generation device 1 is able to limit the region where the texture is modulated. Limiting the region that is modified by using modulation textures makes it possible to increase the resolution or apply a pattern to just one part of the generated image. To limit the region, it suffices, when drawing a basic texture, to draw with a specified alpha value only the part that is to be modified, and to do destination alpha testing when drawing modulation textures.

Also, image generation device 1 can compress the quantity of data by unifying basic textures and modulation textures. In many cases, basic textures and modulation textures are used in fixed combinations (pairs). For example, in the case of an image that has strong self-similarity, such as a picture of nature, natural resolution can be created by using as a modulation texture an image in which the color components have been removed from the basic texture, and in such a case it can be handled as an ordinary RGBA texture if the basic texture is stored in the RGB region and the modulation texture is stored in the texture A region.

If the RGBA texture is expressed using a color lookup table (CLUT), it is possible to express basic textures and modulation textures with 8-bit textures by breaking up and using the CLUT as 8 bits, for example, by allocating 0 to 127 thereof to the MIP0 texture, 128 to 191 thereof to the MIP1 texture, 192 to 223 to the MIP2 texture, and so forth. In general, if the MIP value is larger, pixel values having the average value of the pixel values newly emerge, and the CLUT cannot be shared between textures for different MIPMAPs, which makes the splitting up of the CLUT as described above sufficiently appropriate.

Such data compression makes it possible, for example, to express a 256×256×4= 262 KB texture with 128×128×1=16 KB.

The image generation method of this invention makes it possible to generate overall patterns on polygons by mapping of basic textures, and do amplitude modulation processing, by amplitude modulation mapping of modulation textures, on patterns generated by mapping of basic textures. Therefore, the details of patterns in the region near the viewpoint can be appropriately generated.

The image generation device of this invention has a memory means that stores basic textures mapped to generate the overall pattern on a polygon and modulation textures used to amplitude-modulate the patterns generated by mapping of the basic textures, and an image processing means that, by amplitude modulation mapping of modulation textures, does amplitude modulation processing on the patterns generated by mapping of the basic textures, and thus it is able, by amplitude modulation mapping of modulation textures, to perform amplitude modulation processing on patterns generated by the mapping of basic tenures.

Thus the image generation device can appropriately generate the details of patterns in the region near the viewpoint.

What is claimed is:

1. An image generation method for generating a two-dimensional image by texture mapping to three-dimensional polygons including textures that have been mapped to generate an overall pattern on a polygon, and modulation textures, comprising the steps of:

multiplying each texture that has been mapped by each modulation texture, wherein an amplitude of a modulation texture is changed as a distance from a vicinity of a viewpoint is changed; and displaying on a display apparatus the generated two-dimensional image.

2. The image generation method as described in claim 1, wherein in said multiplying step an amplitude is made smaller with increasing distance from the vicinity of a viewpoint.

3. The image generation method as described in claim 1, wherein a repetition period of textures and a repetition period of modulation textures are offset from each other.

4. The image generation method as described in claim 1, wherein said modulation texture is set to higher spatial frequencies than those of said texture, with color information removed from said texture.

5. The image generation method as described in claim 1, wherein said modulation texture consists of different patterns from said texture.

6. An image generation device for generating a two-dimensional image by texture mapping to three-dimensional polygons, comprising:
- a memory means that stores textures to be mapped to generate an overall pattern on a polygon, and stores modulation textures used to amplitude-modulate the patterns generated by mapping of the textures;
- a multiplying means multiplying each texture that has been mapped to generate the overall pattern on the polygon by each modulation texture, wherein an amplitude is changed as a distance from a vicinity of a viewpoint is changed; and
- a display means that displays the generated two-dimensional image.

7. The image generation device as described in claim 6, wherein in said multiplying the amplitude is made smaller with increasing distance from the vicinity of a viewpoint.

8. The image generation device as described in claim 6, wherein 4 repetition period of textures and a repetition period of modulation textures are offset from each other.

9. The mage generation device as described in claim 6, wherein said modulation texture is set to higher spatial frequencies than those of said texture, with color information removed from said texture.

10. The image generation device as described in claim 6, wherein said modulation texture consists of different patterns from said texture.

11. The image generation device as described in claim 6, wherein a pixel value of a modulation texture represents the intensity for multiplying to the pixel value of an image drawn using said texture.

* * * * *